United States Patent [19]
Konijn

[11] Patent Number: 5,683,629
[45] Date of Patent: Nov. 4, 1997

[54] HORIZONTAL TRAY AND COLUMN FOR CONTACTING GAS AND LIQUID

[75] Inventor: Gerrit Konijn, Amsterdam, Netherlands

[73] Assignee: Shell Oil Company, Houston, Tex.

[21] Appl. No.: 637,977

[22] Filed: Apr. 26, 1996

[30] Foreign Application Priority Data

Jun. 2, 1995 [EP] European Pat. Off. .............. 95201461

[51] Int. Cl.$^6$ ...................................................... B01F 3/04
[52] U.S. Cl. .................................. 261/79.2; 261/DIG. 44
[58] Field of Search ........................... 261/79.2, DIG. 44

[56] References Cited

U.S. PATENT DOCUMENTS

| | | | |
|---|---|---|---|
| 1,983,762 | 12/1934 | Kotzebue | 261/79.2 |
| 2,189,491 | 2/1940 | Hawley | 261/79.2 |
| 3,498,028 | 3/1970 | Trouw | 261/79.2 |
| 3,779,526 | 12/1973 | Tanigawa et al. . | |
| 4,164,399 | 8/1979 | Kannapell | 261/DIG. 44 |
| 4,349,360 | 9/1982 | Schuurmans et al. | 261/79.2 |

FOREIGN PATENT DOCUMENTS

| | | |
|---|---|---|
| 654959 | 4/1965 | Belgium . |
| 978788 | 4/1951 | France . |
| 0676295 | 7/1979 | U.S.S.R. ................... 261/79.2 |

OTHER PUBLICATIONS

Soviet Pat. Absts., Section Ch. Week 9045,19 Dec. 1990 Derwent Pub. Ltd., London GB Class Jol, AN90–341024 XP002013094 & SU, A–1, 535, 563 (SIBE Tech Inst.) 15 Jan. 90 *See abstract* Nov. 9, 1996.

Int. Search Report Nov. 9, 1996, PCT Application No. PCT/EP96/02340, 25, Sep. 1996.

*Primary Examiner*—Tim R. Miles
*Attorney, Agent, or Firm*—Kimbley L. Muller

[57] ABSTRACT

A horizontal tray (3) is disclosed for use in a normally vertical column (1) for counter-currently contacting gas and liquid, which horizontal tray (3) comprises an upper horizontal plate (6), a lower horizontal plate (7), a liquid supply space (8), a liquid feed pipe (10) opening into the liquid supply space (8), and a vertical tubular contact and separation device (13), which comprises an open-ended tube (15) extending through the horizontal plates (6, 7), a liquid delivery device (22) comprising an upwardly directed liquid delivery opening (24, 39) which is in fluid communication with the liquid supply space (8), swirl imparting means (30) arranged in the open-ended tube (15) above the liquid delivery opening (24), and guide means (31) to direct liquid from the upper end of the open-ended tube (15) onto the upper horizontal plate (6), which horizontal tray further comprises an open-ended downcomer (35) having an inlet arranged above the upper horizontal plate (6) and an outlet arranged below the lower horizontal plate (7).

8 Claims, 1 Drawing Sheet

HORIZONTAL TRAY AND COLUMN FOR CONTACTING GAS AND LIQUID

FIELD OF THE INVENTION

The present invention relates to a horizontal tray for use in a normally vertical column for counter-currently contacting gas and liquid. Such a column comprises a housing provided with an inlet for gas and an inlet for liquid which is arranged above the inlet for gas, and an outlet for gas arranged in the upper end of the column and an outlet for liquid arranged in the lower end of the column. The horizontal tray is arranged in the housing between the inlet for gas and the inlet for liquid. During normal operation gas is supplied through the inlet for gas and liquid through the inlet for liquid, and on the horizontal tray gas and liquid are brought in contact with each other to exchange heat and/or matter. After contacting gas separated from the liquid is withdrawn from the column through the outlet for gas which is located above the horizontal tray, and liquid is withdrawn from the column through the outlet for liquid which is located below the horizontal tray.

BACKGROUND OF THE INVENTION

Such a horizontal tray is known from UK patent specification No. 1,070,777. The known horizontal tray comprises a horizontal plate and a vertical tubular contact and separation device, which contact and separation device comprises an open-ended tube extending through an opening in the horizontal plate, a liquid feed pipe which opens near the inner surface of the open-ended tube, swirl imparting means arranged in the open-ended tube above the opening of the liquid feed pipe, and guide means to direct liquid from the upper end of the open-ended tube onto the horizontal plate, which horizontal tray further comprises a tube for removing separated liquid.

A disadvantage of the known horizontal tray is that when such a horizontal tray contains more than one tubular contact and separation device, a liquid feed pipe has to be provided for each of the contact and separation devices. In such a case it is difficult, if not impossible, to supply liquid to each contact and separation device in such a way that the amount of liquid is evenly distributed over the contact and separation device.

DESCRIPTION OF THE INVENTION

It is an object of the present invention to provide a horizontal tray for use in a normally vertical column for counter-currently contacting gas and liquid wherein liquid is evenly distributed over the contact and separation devices.

To this end the horizontal tray according to the present invention for use in a normally vertical column for counter-currently contacting gas and liquid comprises an upper horizontal plate, a lower horizontal plate, a liquid supply space defined between the plates, a liquid feed pipe opening into the liquid supply space, and a vertical tubular contact and separation device, which contact and separation device comprises an open-ended tube extending through openings in the horizontal plates, a liquid delivery device comprising an upwardly directed liquid delivery opening which is in fluid communication with the liquid supply space, swirl imparting means arranged in the open-ended tube above the liquid delivery opening, and guide means to direct liquid from the upper end of the open-ended tube onto the upper horizontal plate, which horizontal tray further comprises an open-ended downcomer having an inlet arranged above the upper horizontal plate and an outlet arranged below the lower horizontal plate.

A further disadvantage of the known tray from the aforementioned British specification is that at relatively low liquid flow rates, the contact efficiency is not very large. One reason is that the opening of the liquid pipe is near the inner surface of the open-ended tube so that liquid is collected on the inner surface. Consequently contacting between liquid and gas has to take place in the film of liquid on the inner surface. A more efficient way of contacting is obtained when the liquid is dispersed in the gas, and this can only be partly achieved with the known device.

To overcome this problem, the liquid delivery device suitably comprises a plurality of parallel channels having upwardly directed openings, which channels are in fluid communication with the liquid supply space. In a suitable alternative design, the liquid delivery device comprises a liquid delivery opening which is centrally arranged in an open-ended tube, which open-ended tube is in fluid communication with the liquid supply tube.

The horizontal tray according to the present invention can be used for low flow parameters, even for flow parameters which are less than 0.01. The flow parameter is defined as $(L/G)*(\rho_l/\rho_g)^{1/2}$, wherein L is the liquid flow rate in m³/s, G is the gas flow rate in m³/s, $\rho_l$ is the liquid density in kg/m³, and $\rho_g$ is the gas density in kg/m³.

The invention also relates to a normally vertical column for counter-currently contacting gas and liquid comprising at least one horizontal tray according to the present invention, which horizontal tray is arranged in the column between an inlet for gas and an inlet for liquid.

The invention further relates to a normally vertical column provided with two or more horizontal trays according to the invention, wherein the liquid feed pipe of one horizontal tray is in fluid communication with the downcomer of the above horizontal tray.

The invention will now be described by way of example in more detail with reference to the accompanying drawings, wherein

DETAILED DESCRIPTION OF THE DRAWINGS

Figure 1:
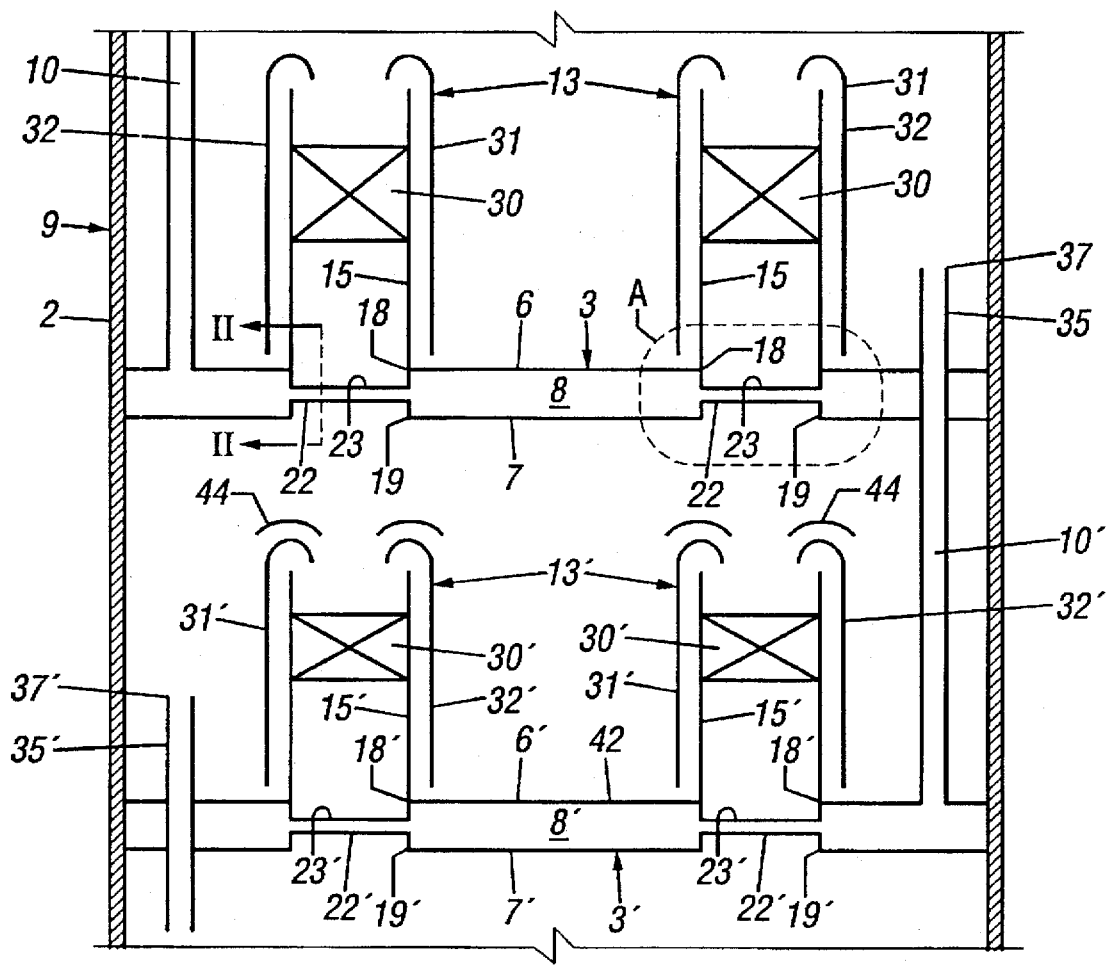
FIG. 1 shows schematically a cross-section of part of a normally vertical column for counter-currently contacting gas and liquid provided with horizontal trays according to the present invention.
Figure 2:
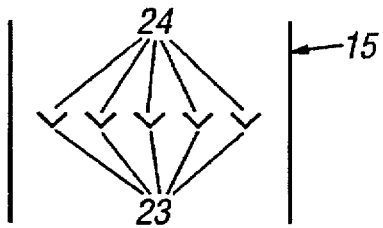
FIG. 2 shows cross-sectional view II—II, drawn to a scale larger than the scale of FIG. 1.

Reference is now made to FIGS. 1 and 2, showing a cross-sectional view of part of a vertical column 1 for counter-currently contacting gas and liquid comprising a housing 2 provided with the horizontal trays 3 and 3'. The upper horizontal tray 3 is arranged above the lower horizontal tray 3'. The lower horizontal tray 3' is similar to the upper horizontal tray 3 and corresponding parts of the lower horizontal tray 3' have corresponding reference numerals provided with a dash, i.e. 1A in the upper tray is 6' in the lower tray.

The upper horizontal tray 3 comprises an upper horizontal plate 6 and a lower horizontal plate 7. Between the upper and lower horizontal plates 6 and 7 is defined a liquid supply space 8. To supply liquid into the liquid supply space 8 during normal operation, the upper horizontal tray is provided with a liquid feed pipe 10 opening into the liquid supply space 8.

The upper horizontal tray 3 is furthermore provided with a vertical tubular contact and separation device 13. This contact and separation device 13 comprises an open-ended tube 15 extending through openings 18 and 19 in the horizontal plates 6 and 7. The contact and separation device 13 comprises a liquid delivery device 22. The liquid delivery device comprises a plurality of parallel channels 23, wherein each channel 23 is provided with an upwardly directed liquid delivery opening 24. The channels 23 are in fluid communication with the liquid supply space 8. The number of channels is suitably between 1 and 10.

The contact and separation device 13 further comprises swirl imparting means 30 arranged in the open-ended tube 15 above the liquid delivery device 22, and guide means 31 to direct liquid from the upper end of the open-ended tube 15 onto the upper horizontal plate 6. The guide means 31 include an outer tube 32 having an inwardly deflecting upper end, which outer tube 32 extends around the open-ended tube 15 to above the upper horizontal plate 6.

The upper horizontal tray 3 further comprises an open-ended downcomer 35 having an inlet 37 arranged above the upper horizontal plate 6 and an outlet arranged below the lower horizontal plate 7. In the embodiment shown, the downcomer 35 opens into the liquid feed pipe 10' of the lower horizontal tray 3'. The distance between the upper horizontal plate 6 and the lower end of the outer tube 32 is less than the distance between the upper horizontal plate 6 and the inlet 37 of the downcomer 35.

During normal operation liquid supplied through liquid feed pipe 10 into the liquid supply space 8 of the upper horizontal tray 3 is brought into contact on the upper horizontal tray 3 with gas from the lower horizontal tray 3' passing upwardly into the lower end of the open-ended conduits 15. The gas flows past the liquid delivery devices 22, and liquid from the liquid delivery devices 22 is dispersed in the gas streams. The mixture of liquid dispersed in gas passes upwardly through the open-ended tubes 15 and gets a swirling motion from passing along the swirl imparting means 30. Liquid is thrown outward and a liquid-rich stream passes near the inner surface of the upper parts of the open-ended tubes 15. Liquid separated from the gas stream is directed by guide means 31 from the upper end of the open-ended tubes 15 onto the upper horizontal plate 6. A substantially liquid-free gas stream passes upwardly to the outlet for gas (not shown) arranged in the upper end of the housing 2. Liquid collected on the upper horizontal plate 6 is passed through the downcomer 35 and the liquid feed pipe 10' into the liquid supply space 8' of the below horizontal tray 3'.

On this horizontal tray 3' liquid is brought in contact with gas coming from below the horizontal tray 3', and the way in which liquid is brought in contact with gas is the same as described above. After contacting, liquid separated from the gas is passed through downcomer 35' to the next lower horizontal tray (not shown) or to the outlet for liquid (not shown) arranged in the lower end of the housing 2.

Contact between liquid and gas takes place when the liquid is dispersed in the gas.

Figure 3:
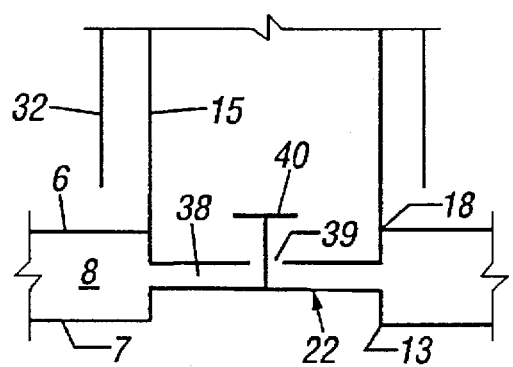
FIG. 3 shows schematically an alternative to the design of the tubular contact and separation device of FIG. 1 drawn to a scale larger than the scale of FIG. 1.

Reference is now made to FIG. 3 showing schematically an alternative design of part A of the vertical contact and separation device 13. The difference resides in the fact that the liquid delivery device 22 comprises an open-ended conduit 38 provided with an upwardly directed liquid delivery opening 39, wherein the open ends of the open-ended conduit 38 open into the liquid supply space 8. The operation of this design is similar to the above described operation.

To further improve the dispersion of gas in the liquid stream a deflector 40 is arranged directly above the liquid delivery opening 39. Suitably the deflector 40 is a plate which has a diameter up to 0.50 times the internal diameter of the open-ended tube 15.

To allow operation of column 1 at very low liquid flow rates it is beneficial to recirculate liquid collected on the upper horizontal plate. To this end the upper horizontal plate is provided with a recirculation opening. To illustrate this embodiment one recirculation opening 42 is shown in the upper plate 6' of the lower horizontal tray 3', however, the upper plate may be provided with more than one recirculation opening. The number and the seize of the recirculation openings is suitably so selected that the mass flow rate through the recirculation openings can be up to five times the mass flow rate through the downcomer 35'.

In the embodiment as shown in the drawing the guide means 31, 31' directs liquid from the upper end of the open-ended tubes 15, 15' through outer tubes 32, 32'. Each guide means 31, 31' suitably further includes a beaker-shaped gas outlet arranged in the upper end of the outer tube. To illustrate this embodiment a beaker-shaped gas outlet 44 is shown in the guide means 31' pertaining to the contact and separation devices 13' of the lowermost horizontal tray 3'.

In the embodiment shown in FIG. 1 the open-ended downcomer 35 passes into the liquid feed pipe 10' of the lower horizontal tray 3'. In an alternative design (not shown), the liquid feed pipe has a larger diameter than the downcomer, and the downcomer extends through the open end of liquid feed pipe into the liquid feed pipe. At least part of the annular space between the liquid feed pipe and the downcomer is then filled with liquid which provides a seal.

The invention will now be illustrated with the aid of the following example.

A single horizontal tray was used to determine the transfer of heat between gas and liquid. This tray was provided with a tubular contact and separation device including an open-ended tube having an inner diameter of 110 mm. Three different liquid delivery devices were tested: (1) a liquid delivery device provided with an opening at the inner surface of the open-ended tube (this is not according to the invention); (2) the liquid delivery device of FIGS. 1 and 2 wherein six parallel channels were used having a width of 5 mm and a height of 25 mm; and (3) the liquid delivery device as shown in FIG. 3, wherein the diameter of the upwardly directed opening was 17 mm, the diameter of the deflector 35 mm and the height of the deflector above the opening 20 mm. The liquid delivery devices will be designated with LDD1, LDD2 and LDD3, respectively.

In the experiments, water and air were contacted, the water had a temperature of 20° C., and the flow parameter $\phi$, the load factor $\lambda$ and the gas temperatures are included in the below Table. The flow parameter has been defined herein above, and the load factor is $(V_g)*(\rho_g/\Delta\rho)^{1/2}$, wherein $V_g$ is the gas velocity in the open-ended tube in m/s, and $\rho_g$ is the gas density in kg/m$^3$. $\Delta\rho$ is the difference between $\rho_l$ and $\rho_g$, wherein $\rho_l$ is the liquid density in kg/m$^3$. $T_{gin}$ is the gas temperature at the gas inlet, $T_{gout}$ is the gas temperature at the gas outlet, and $\Delta T_g$ is the difference between the two temperatures.

TABLE

Results of the tests of the three liquid supply devices.

|      | φ (−) | λ (m/s) | $T_{gin}-T_{gout}$ (°C.) | $\Delta T_g$ (°C.) |
|------|-------|---------|--------------------------|--------------------|
| LDD1 | 0.09  | 0.61    | 35.8–28                  | 7.8                |
| LDD2 | 0.10  | 0.61    | 35.4–25                  | 10.4               |
| LDD3 | 0.11  | 0.60    | 40.6–27.5                | 13.1               |

From the results shown in the above Table it can be concluded that under substantially the same conditions the $\Delta T_g$ obtained with the liquid delivery device not according to the invention (LDD1) is smaller than the $\Delta T_g$'s obtained with the liquid delivery devices according to the invention (LDD2 and LDD3). The larger the $\Delta T_g$ the more heat is transferred, and the results show the advantageous effect of the use of the horizontal tray of the present invention.

The horizontal tray of the present invention is suitably used in a column for drying natural gas, wherein the natural gas is counter-currently contacted with a solvent for water vapor such a glycol.

What is claimed is:

1. An apparatus comprising a horizontal tray for use in a normally vertical column for counter-currently contacting gas and liquid, which horizontal tray comprises an upper horizontal plate provided with a recirculation opening, a lower horizontal plate, a liquid supply space defined between the plates, a liquid feed pipe opening into the liquid supply space, and a vertical tubular contact and separation device, which contact and separation device comprises an open-ended tube extending through openings in the horizontal plates, a liquid delivery device comprising an upwardly directed liquid delivery opening which is in fluid communication with the liquid supply space, swirl imparting means arranged in the open-ended tube above the liquid delivery opening, and guide means to direct liquid from the upper end of the open-ended tube onto the upper horizontal plate, which horizontal tray further comprises an open-ended downcomer having an inlet arranged above the upper horizontal plate and an outlet arranged below the lower horizontal plate.

2. The horizontal tray according to claim 1, wherein the liquid delivery device comprises a plurality of parallel channels in fluid communication with the liquid supply space and having upwardly directed openings.

3. The horizontal tray according to claim 1, wherein the liquid delivery device comprises a liquid delivery opening which is centrally arranged in the open-ended tube.

4. The horizontal tray according to claim 3, wherein the vertical tubular contact and separation device comprises a deflector situated directly above the liquid delivery opening.

5. The horizontal tray according to claim 4, wherein the deflector comprises a plate having a diameter up to 0.50 times the internal diameter of the open-ended tube.

6. The horizontal tray according to claim 1 wherein the guide means to direct liquid from the upper end of the open-ended tube comprises an outer tube having an inwardly deflecting upper end, which outer tube extends from around the open-ended tube to above the upper horizontal plate.

7. The horizontal tray according to claim 6, wherein the distance between the upper horizontal plate and the lower end of the outer tube is less than the distance between the upper horizontal plate and the inlet of the downcomer.

8. The horizontal tray according to claim 6, wherein the guide means to direct liquid from the upper end of the open-ended tube comprises a beaker-shaped gas outlet situated in the upper end of the outer tube.

* * * * *